United States Patent
Klein et al.

(10) Patent No.: US 11,941,021 B2
(45) Date of Patent: Mar. 26, 2024

(54) AUTOMATIC CREATION OF BLOCKCHAIN NETWORK INFRASTRUCTURES

(71) Applicant: Accenture Global Solutions Limited, Dublin (IE)

(72) Inventors: Michael W. Klein, Golden Valley, MN (US); Manuel Merino, West Long Branch, NJ (US); Pramodsing Bijani, Mumbai (IN); Mahesh Krishna Bandkar, Mumbai (IN); Mufaddal Moazam Kantawala, Mumbai (IN); Anand Parulkar, Mumbai (IN); Sownak Roy, Manchester (GB); Ankur A. Banerjee, London (GB); Peter Bidewell, Diss (GB)

(73) Assignee: Accenture Global Solutions Limited, Dublin (IE)

( * ) Notice: Subject to any disclaimer, the term of this patent is extended or adjusted under 35 U.S.C. 154(b) by 140 days.

(21) Appl. No.: 17/078,243

(22) Filed: Oct. 23, 2020

(65) Prior Publication Data
US 2021/0124760 A1 Apr. 29, 2021

(30) Foreign Application Priority Data
Oct. 25, 2019 (IN) .............................. 201911043501

(51) Int. Cl.
*G06F 16/27* (2019.01)
*G06F 8/61* (2018.01)
*G06F 16/23* (2019.01)

(52) U.S. Cl.
CPC ................ *G06F 16/27* (2019.01); *G06F 8/61* (2013.01); *G06F 16/2379* (2019.01)

(58) Field of Classification Search
None
See application file for complete search history.

(56) References Cited

U.S. PATENT DOCUMENTS 10,291,395 B1 * 5/2019 Nenov .................. H04L 9/3226
10,305,752 B2 * 5/2019 Bildhauer ........... H04L 41/5032
(Continued)

OTHER PUBLICATIONS

Github.io [online], "Irills/helm-unittest," Apr. 8, 2019, retrieved on Nov. 3, 2020, retrieved from URL<https://github.com/lrills/helm-unittest>, 6 pages.
(Continued)

*Primary Examiner* — Kris E Mackes
*Assistant Examiner* — Cao D Vuong
(74) *Attorney, Agent, or Firm* — Fish & Richardson P.C.

(57) ABSTRACT

Methods, systems, and computer-readable storage media for automatic creation of distributed ledger networks. A request to deploy a distributed ledger network is received by an automation framework. The request comprising a configuration file and is associated with a platform type for one or more platforms for deployment of the distributed ledger network. Configuration prerequisites are determined for performing installations of software components on the one or more platforms. In response to installing the software components, the software components are configured and executed to set up an environment for deploying the distributed ledger network by creating a build folder, copying the configuration file and key files for accessing a source code repository into the build folder, and updating the configuration file according to criteria associated with the platform type. A provisioning script is executed to deploy the distributed ledger network on the set-up environment according to the updated configuration file.

19 Claims, 7 Drawing Sheets

(56) References Cited

U.S. PATENT DOCUMENTS

| | | | |
|---|---|---|---|
| 10,417,217 B2* | 9/2019 | Pierce | G06F 21/64 |
| 10,762,079 B2* | 9/2020 | Shi | H04L 9/0637 |
| 11,341,503 B2* | 5/2022 | Concannon | H04L 9/50 |
| 2018/0260212 A1* | 9/2018 | Wisnovsky | G06F 16/113 |
| 2018/0308072 A1* | 10/2018 | Smith | G06Q 20/02 |
| 2019/0102409 A1* | 4/2019 | Shi | H04L 41/5054 |
| 2020/0112443 A1* | 4/2020 | Todd | H04L 9/0637 |
| 2020/0137154 A1* | 4/2020 | Wu | G06F 16/27 |
| 2020/0234816 A1* | 7/2020 | De Armas | G16H 70/20 |
| 2020/0236168 A1* | 7/2020 | Todd | H04L 67/12 |
| 2022/0148268 A1* | 5/2022 | Yilanci | G06T 19/006 |

OTHER PUBLICATIONS

Gruntwork.io [online], "Automated Testing for Kubernetes and Helm Charts using Terratest," Feb. 26, 2019, retrieved on Nov. 3, 2020, retrieved from URL<https://blog.gruntwork.io/automated-testing-for-kubernetes-and-helm-charts-using-terratest-a4ddc4e67344>, 12 pages.

* cited by examiner

AUTOMATIC CREATION OF BLOCKCHAIN NETWORK INFRASTRUCTURES

CLAIM OF PRIORITY

This application claims priority under 35 USC § 119(e) to Indian Patent Application No. 201911043501, filed on Oct. 25, 2019, the entire contents of which are hereby incorporated by reference in the entirety for all purposes.

TECHNICAL FIELD

The present disclosure relates to computer-implemented methods, software, and systems for data processing in a cloud platform environment.

BACKGROUND

Distributed ledger technology (DLT), also commonly referred to as blockchain technology, is an increasingly popular distributed data system that maintains and records data in a way that allows multiple stakeholders to confidently share access to the same data and information. A distributed ledger can be described as a data ledger, copies of which are stored on multiple entities operating on a distributed network. Different DLT platforms may have different architectures that are associated with different processes for setting up the distributed network, the protocol for adding data to the distributed ledger, channels for connecting to the distributed network, and the like.

SUMMARY

Implementations of the present disclosure are generally directed to computer-implemented systems for automatic deployment of production-ready distributed ledgers running on different platforms.

One example method may include operations such as receiving, by an automation framework, a request to deploy a distributed ledger network, the request comprising a configuration file and being associated with a platform type for one or more platforms for deployment of the distributed ledger network; determining, by the automation framework, configuration prerequisites for performing installations of software components on the one or more platforms, the software components are associated with configuring, provisioning, and managing of the distributed ledger network; in response to installing the software components on the one or more platforms, configuring and executing the software components to set up an environment for deploying the distributed ledger network by: creating a build folder, copying the configuration file and key files for accessing a source code repository into the build folder, the configuration file corresponding to the platform type of the one or more platforms requested, and updating the configuration file according to criteria associated with the platform type; and executing, by the automation framework, a provisioning script to deploy the distributed ledger network on the set-up environment according to the updated configuration file.

Implementations can optionally include that updating the configuration file comprises updating access data, security metadata, network metadata, and account data for the source code repository.

In some instances, the automation framework may provide services for automatic configuration and deployment of one or more distributed ledger networks associated with different platform types. In some instances, the automation framework may be instantiated to provide tools to support deployment of distributed ledger networks of multiple network types.

In some instances, the configuration file may define one or more services provided from the software components installed on the one or more platforms to be executed in relation to creating the distributed ledger network.

In some instances, the one or more platforms may be instantiated to employ a production reference architecture that integrates distributed ledger technology services with services for automatically building a production deployment of a cloud infrastructure based on the configuration file. In some instances, the one or more platforms may provide resources for deploying a platform application on the cloud infrastructure based on executing configuration and deployment services provided by the platform.

In some instances, the distributed ledger network may be deployed in a production-ready mode to provide secure interaction between defined entities at the configuration file.

In some instances, the deployed distributed ledger network may be deleted by executing a script that resets the distributed ledger network using the configuration file.

In some instances, setting up the environment for deploying the distributed ledger network may include verifying whether a distributed ledger of the distributed ledger network is successfully configured by verifying statuses associated with different namespaces associated with clusters where the distributed ledger is running.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

Like reference symbols in the various drawings indicate like elements.

DETAILED DESCRIPTION

Implementations of the present disclosure are generally directed to computer-implemented systems for automatic creation of distributed ledger networks. More particularly, implementations of the present disclosure are directed to a computer-implemented platform for providing tools to support for automatic configuration and deployment of a distributed ledger network infrastructure. Implementations of the present disclosure are directed to providing tools to support automatic creation of distributed ledger networks of different platform types. A well-known distributed ledger includes Blockchain, which supports the crypto-currency Bitcoin. In view of the popularity of Blockchain, distributed ledgers are commonly referred to as blockchains. In view of this, the present disclosure refers to a distributed ledger and a blockchain interchangeably and without reference to any particular network.

In some instances, an automation framework for creation of distributed ledger networks can support deployment of production ready distributed networks across public and private cloud providers. When a distributed ledger network is requested to be created, the creation can be associated with a set of requirements associated with the technologies used for the creation. Thus, an automation framework can support different combination of technologies that can be associated with requirements for creation of distributed ledger network.

In accordance with implementations of the present disclosure, the distributed ledger network provides a single source of truth for data objects that are associated with partner systems of the distributed ledger network. Multiple enterprises may agree and configure their systems and applications to communicate with regards to related data objects using the distributed ledger network to provide verification of data authenticity.

To provide further context for implementations of the present disclosure, the distributed ledger network maintains a distributed ledger, also referred to herein as a blockchain. The distributed ledger network, or blockchain network, may be made up of peer-to-peer nodes, and enables participating entities corresponding to partner systems to securely, and immutably conduct transactions and store data. Again, and as noted above, although the term blockchain is generally associated with the Bitcoin crypto-currency network, blockchain is used herein to generally refer to a distributed ledger without reference to any particular use case.

A blockchain is made up of a chain of blocks, each block storing data. Example data includes data representative of a data object created in relation to interactions between two or more participants. While data objects are used herein by way of non-limiting example, it is contemplated that any appropriate data can be stored in a blockchain (e.g., documents, images, videos, audio). The stored data in a blockchain may be hash values for documents, images, videos, audios, or other data object in general. The hash values may be stored by executing transactions at the blockchain network. The stored data represent data that is immutably stored within the blockchain. That is, the stored hash value data cannot be changed. Accordingly, a blockchain is a data structure that stores data in a way that the data is immutable and can be verified. Each block in the chain is linked to a previous block immediately before it in the chain by including a cryptographic hash of the previous block. A block also includes a timestamp, its own cryptographic hash, and data. Each block is provided based on one or more executed transactions.

In some instances, to deploy a blockchain network, different platforms as a foundation for the deployment can be used where different software components can be installed on a selected platform to perform configuration, provisioning, and management of a running blockchain network. When a blockchain network is requested to be deployed, the request may comprise requirements for setting up an environment for the deployment and executing source code associated with the blockchain. To support the deployment process of blockchain networks that can be related to requests associated with different requirements and technologies, an automation framework may be provided for rapid and consistent deployment of production-ready blockchain networks. The blockchain networks can be deployed in a cloud environment and may be executed over cloud infrastructure that can be provided by different infrastructure providers.

Figure 1:
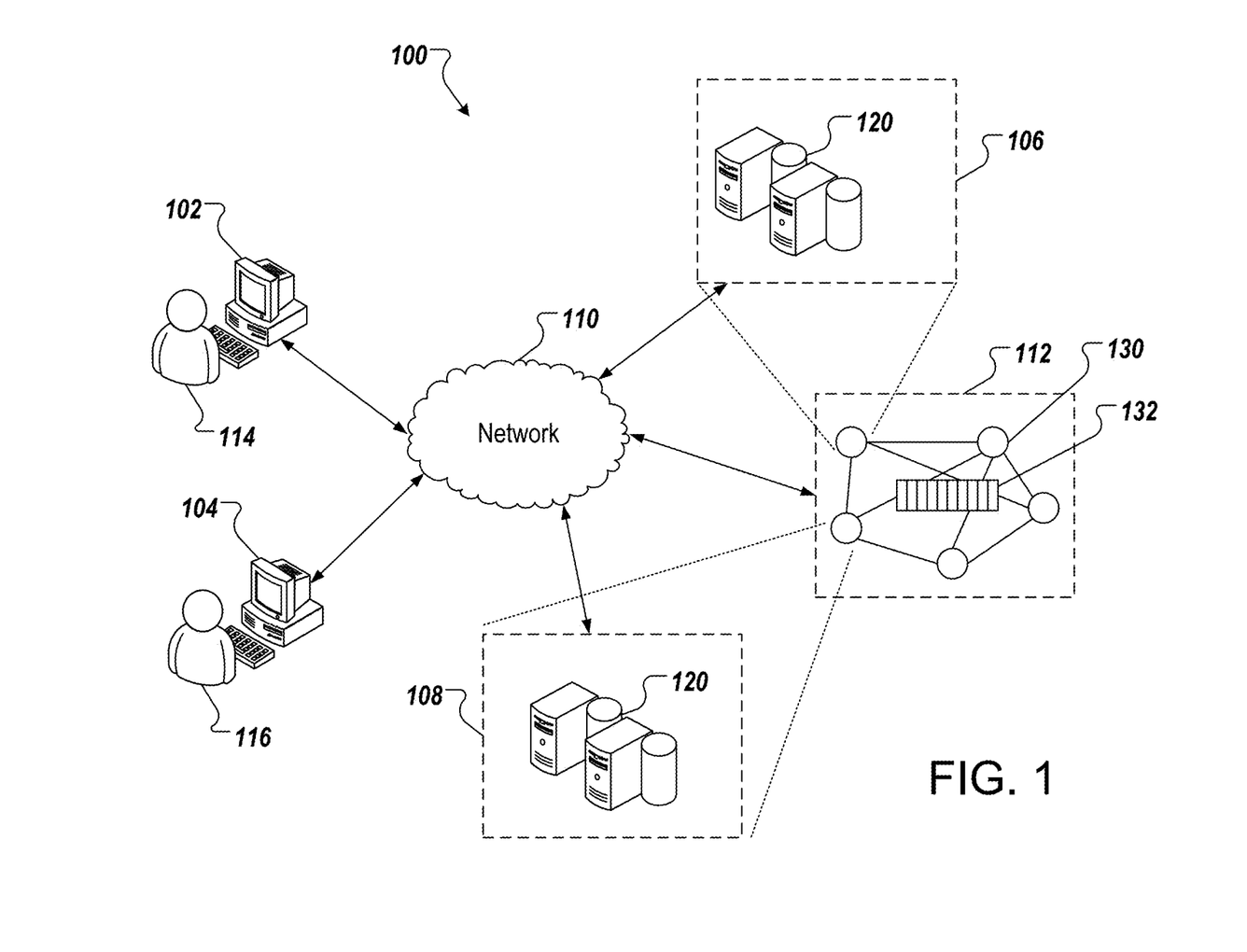
FIG. 1 depicts an example system that can execute implementations of the present disclosure.

FIG. 1 depicts an example environment 100 that can be used to execute implementations of the present disclosure. In some examples, the example environment 100 enables users associated with respective systems (e.g., employees, data administrators, contractors, representatives) to manage (e.g., create, execute, close) data objects (e.g., contracts, business objects) between enterprises created by corresponding software system in a technology platform. The example environment 100 includes computing devices 102, 104, back-end systems 106, 108, a network 110, and a blockchain network 112 (e.g., consortium blockchain network). In some examples, the computing devices 102, 104 are used by respective users 114, 116 to log into and interact with the platforms and running applications according to implementations of the present disclosure.

In the depicted example, the computing devices 102, 104 are depicted as desktop computing devices. It is contemplated, however, that implementations of the present disclosure can be realized with any appropriate type of computing device (e.g., smartphone, tablet, laptop computer, voice-enabled devices). In some examples, the network 110 includes a local area network (LAN), wide area network (WAN), the Internet, or a combination thereof, and connects web sites, user devices (e.g., computing devices 102, 104), and back-end systems (e.g., the back-end systems 106, 108). In some examples, the network 110 can be accessed over a wired and/or a wireless communications link. For example, mobile computing devices, such as smartphones can utilize a cellular network to access the network 110.

In the depicted example, the back-end systems 106, 108 each include at least one server system 120. In some examples, the at least one server system 120 hosts one or more computer-implemented services that users can interact with using computing devices. For example, components of enterprise systems and applications can be hosted on one or more of the back-end systems 106, 108. In some examples, a back-end system can be provided as an on-premise system that is operated by an enterprise or a third party taking part in cross-platform interactions and data management. In some examples, a back-end system can be provided as an off-premise system (e.g., cloud or on-demand) that is operated by an enterprise or a third-party on behalf of an enterprise.

In some examples, the computing devices 102, 104 each include a computer-executable applications executed thereon. In some examples, the computing devices 102, 104 each include a web browser application executed thereon, which can be used to display one or more web pages of platform running application. In some examples, each of the computing devices 102, 104 can display one or more GUIs that enable the respective users 114, 116 to interact with the computing platform.

In some implementations, the blockchain network 112 is provided by a third-party provider. In some examples, the blockchain network 112 is one of a permissionless blockchain network, and a permissioned blockchain network. In general, in a permissionless blockchain network, the identity of participants can be obfuscated (e.g., pseudonymous, anonymous), and anyone can participate, read all transactions, participate in the process of block verification to create consensus (described in further detail herein), and the like. In general, in a permissioned blockchain network, all participants are known, approved, and governed.

In general, and as introduced above, a blockchain is a ledger including records that have ever been executed in one or more contexts (e.g., a contract between multiple parties). Whereas a blockchain is a data structure for storing transactions, a blockchain network is a network of computing nodes that manage, update, and maintain one or more blockchains. A blockchain constantly grows as completed blocks are added with a new set of transactions. In some examples, a single block (or block node) is provided from one or more transactions. Blocks may be added to the blockchain in a linear, chronological order by one or more computing devices in a peer-to-peer network of interconnected computing devices that execute a consensus protocol. The peer-to-peer network can be described as a plurality of interconnected nodes, each node being a computing device that uses a client to validate and relay transactions (e.g., resource transfers, data object manipulations). Each node maintains a copy of the blockchain, which is automatically downloaded to the node upon joining the peer-to-peer network. A consensus protocol provides a secure and reliable method of updating the blockchain, copies of which are distributed across the peer-to-peer network, without the need for a central authority.

A blockchain network can be provided as a public blockchain network, a private blockchain network, or a consortium blockchain network. Multiple nodes within the blockchain network may participate in the consensus protocol and perform work to have a block added to the blockchain.

Because all users (e.g., participants in an agreement over a document) need to know all previous related data objects (e.g., contract creation, edits, signature, object versions) to validate a requested transaction to store a data for a data object at the blockchain network, at least a portion of the participants (e.g., users, a majority of users working with application on partner systems) must agree on which data objects and/or versions have actually occurred, and in which order. That is, consensus must be reached. For example, if two users observe different data object histories, they will be unable to come to the same conclusion regarding the validity of a transaction. In some examples, all users agree on the same rules used to validate transactions (e.g., as provided in the blockchain protocol), thus coming to a consensus.

With continued reference to FIG. 1, the blockchain network 112 is provided as a peer-to-peer network including a plurality of nodes 130, at least some of which immutably record information in a blockchain 132 (distributed ledger). Although a single blockchain 132 is schematically depicted, multiple copies of the blockchain 132 are provided and maintained across the blockchain network 112. For example, multiple nodes 130 each store a copy of the blockchain 132. In some implementations, the blockchain 132 stores information including, without limitation, contracts, transactions, supporting documents, and the like.

As introduced above, implementations of the present disclosure can be realized using the example blockchain network (e.g., distributed ledger platform) 112.

In accordance with implementations of the present disclosure, and as noted above, the back-end systems 106, 108 may host enterprise applications or systems that require data sharing and data privacy. The blockchain network 112 may be defined as a central component for facilitating data management and communication between partner systems.

Figure 2:
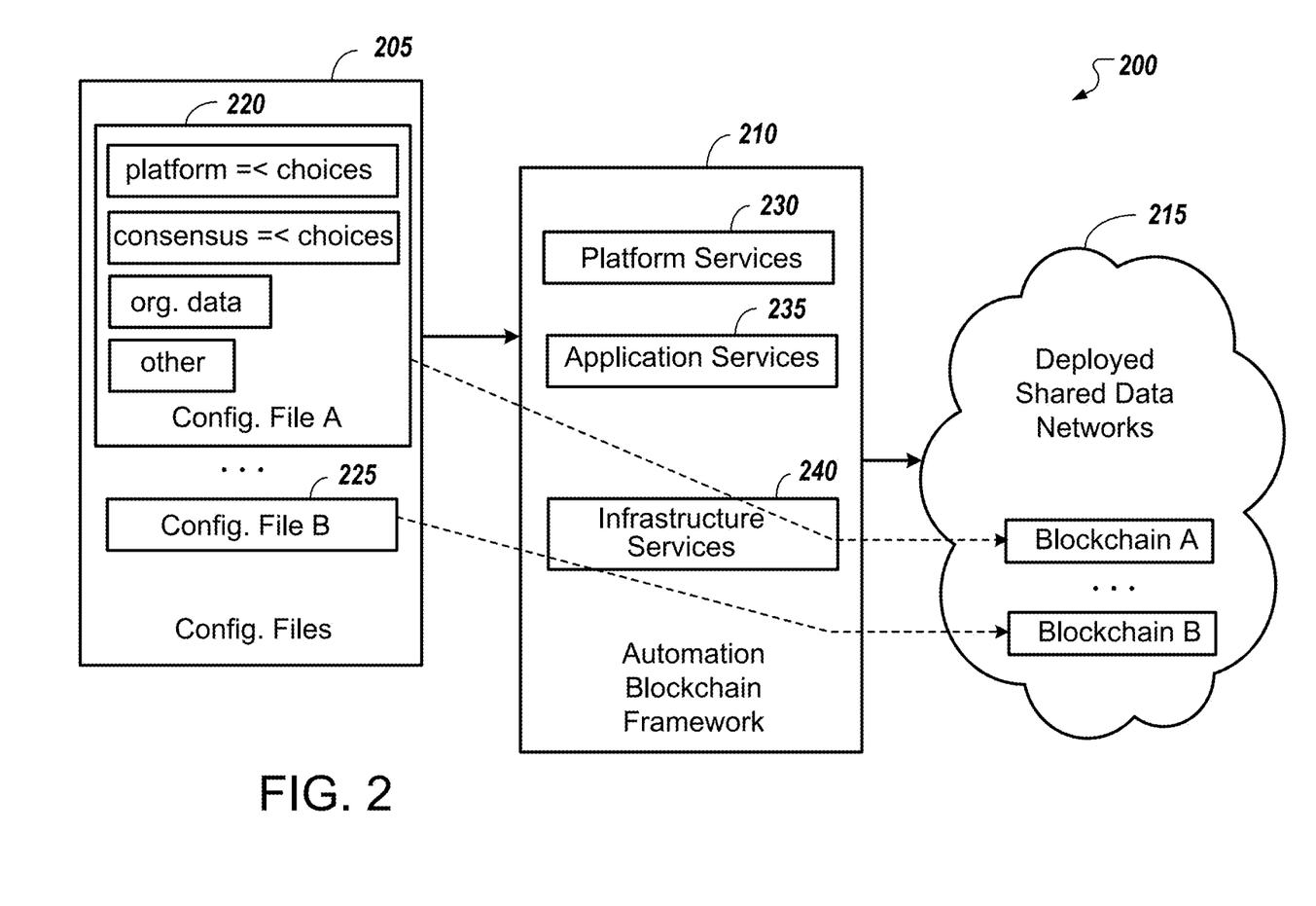
FIG. 2 depicts an example system environment for automated deployment of distributed ledger networks according to implementations of the present disclosure.

FIG. 2 depicts an example system environment 200 for automated deployment of blockchain networks according to implementations of the present disclosure.

In accordance with implementations of the present disclosure, the example system environment 200 includes an automation blockchain framework 210 that uses multiple technologies, tools, services and solutions to deploy production-ready blockchain networks. The automation blockchain framework 210 can be configured to receive configuration files 205 of corresponding requests for deploying and configuring blockchain networks.

In response to a request that includes a configuration file of the configuration files 205, the automation blockchain framework 210 may use a deployment service corresponding to the request and to automatically perform deployment of a blockchain network on a cloud infrastructure that is compatible with the deployment service. The automation blockchain framework 210 may provide tools and techniques that support configuring a blockchain network and generating instructions for deployment that correspond to a selected deployment service and cloud infrastructure technology used for the deployment. For example, the automation blockchain framework may use Ansible, Helm, and/or Kubernetes to perform deployment of blockchain network and run each as part of the deployed share data networks 215.

Ansible can be described as an automation command line tool that supports system configuration, software deployment and other tasks associated with orchestration of operations. A configuration tool, such as Ansible, may support execution of commands that can be invoked by users to determine status of system environment and to set up configurations.

In some instances, the automation framework 210 may use a command line tool, such as Ansible playbooks to create a blockchain network. For example, such a command line tool can be used to issue certificates for each node in the blockchain network, and to store the certificates into a key management tool, such as Hashicorp Vaults. The command line tool may have designed roles that are predefined and follow a specific order that support the set-up of the blockchain network in an automatic manner.

In some instances, a platform for deploying a blockchain network may be selected through operations with the automation blockchain framework 210 and required software components, including services and tools, can be installed on the platform on which the blockchain network is to be deployed. The required software components may be defined as prerequisite that are associated with a given platform type, as the platform type may be defined with the request for deployment. The required software components may be installed on the platform where source code associated with the deployment of the blockchain network is to be executed.

The automation blockchain framework 210 may provide different services that support the configuration, deployment, and managing of blockchain networks that are requested for deployment based on received requests.

The automation blockchain framework 210 may support setting up environments of multi-cluster distributed platforms for setting up blockchain network, such as Hyperledger Fabric or R3 Corda. The different distributed platforms may have different and specific components (e.g. channels and orderers in Fabric, and Doorman, Notary in Corda). The automation blockchain framework 210 uses a configuration file that is designed to leverage differences between the different platforms and to support a consistent set-up of the blockchain network irrespective of the underplaying platform.

In some instances, when prerequisites (including software components, configurations, metadata, account data, other) for a deployment request are determined and relevant software components are installed on a selected platform for deploying the blockchain network, a configuration for accessing source code from an application repository may be provided. Based on the installed components and the source code, the automation blockchain framework can execute the deployment and configuration of the blockchain network and deliver it as part of the deployed shared data networks 215.

Figure 3:
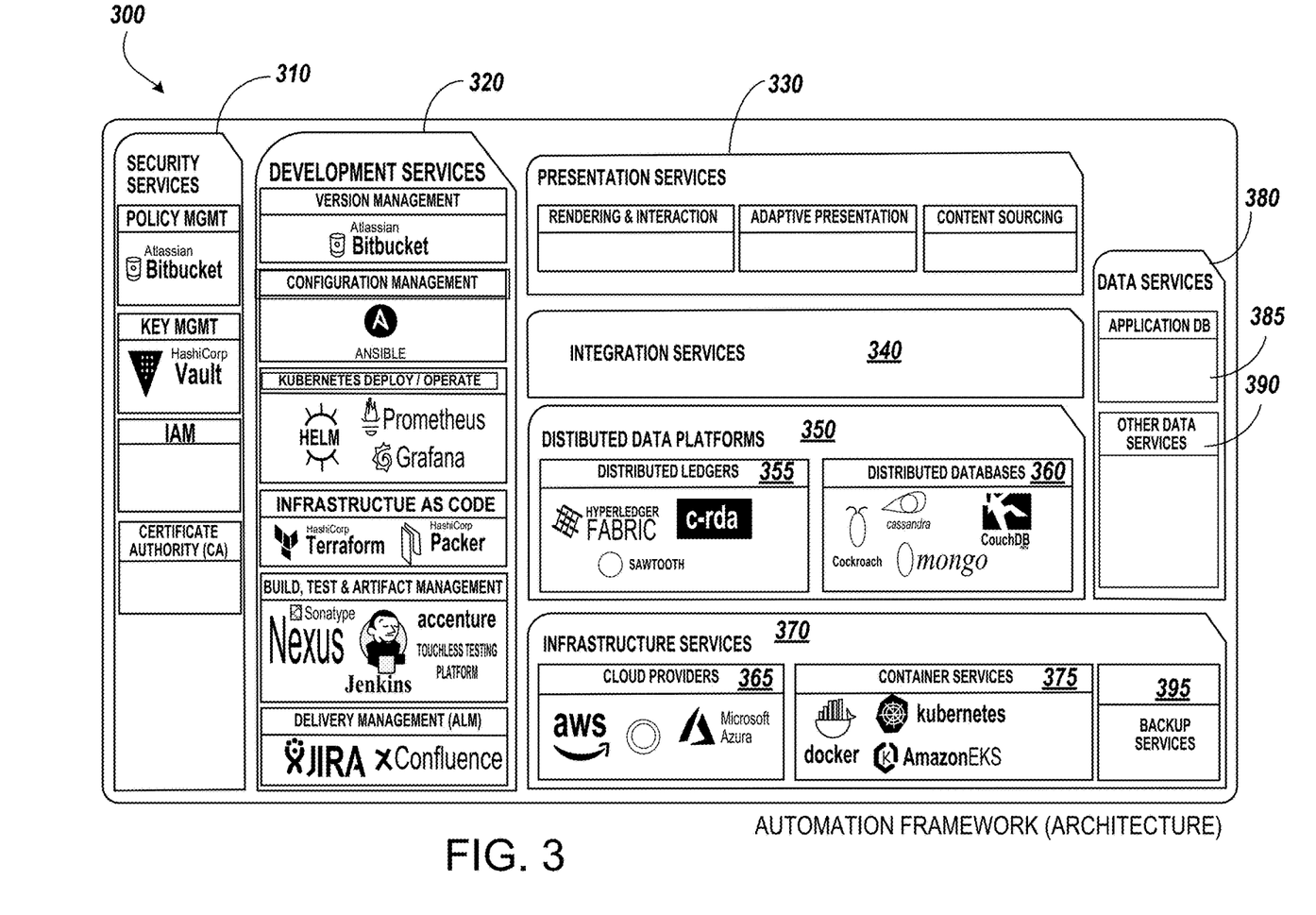
FIG. 3 depicts an example system providing platform services for automatic deployment of distributed ledger networks according to implementations of the present disclosure.

FIG. 3 depicts an example system 300 providing platform services for automatic deployment of blockchain networks according to implementations of the present disclosure.

In some instances, the example system 300 includes software components provided by an automation blockchain framework, such as the automation blockchain framework 210 of FIG. 2.

The automation framework 300 may provide tools, services, and techniques to support consistency when deploying distributed networks across public and private cloud providers. In this manner, the development of applications can be separated from the specifics of the underlying framework that is used for building, as the developed application can be adapted to be executed according to a set of requirements. The automation framework 300 may support efficient and quick provisioning of development environments that can support different requirements for consortium set-ups.

The automation framework 300 is defined by a framework architecture that incorporates multiple services that can be invoked when setting up a blockchain network based on received requests associated with different platform technologies. In the example of FIG. 3, the automation framework 300 includes security services 310, development services 320, presentation services 330, integration services 340, distributed data platforms 350, infrastructure services 370, and data services 380.

In some instances, the security services 310 are services to enable the security of cryptographic keys, users, nodes, and transactions along with the infrastructure supporting those services. The security services 310 includes policy management services, key management services, Identity and Access Management (IAM) service, certificate authority services.

The policy management services support policy management as a process of creating, communicating, and maintaining policies and procedures within an organization. Policy Management is a key feature used in development as well as operations of a product as it identifies who has control in the development, test, and operations environment(s). For example, the policy management services may be provided by a GIT repository. The automation framework 300 may use GITOPS for deployment and operations, where all policies may be defined in the GIT repository.

Key management is the process of overseeing the generation, exchange, storage, use and destruction of cryptographic keys. Key management is an important consideration for blockchain as transactions in blockchain are signed using digital keys. Loss of keys can lead to security breaches and loss of protected data that can interfere with transaction execution.

The automation framework 300 may use Hashicorp Vault service to provide key management services and hold secrets that are used by the blockchain platform. A secret may be an object, such as a data string, that you want to tightly control access to, e.g., API keys, passwords, certificates). A key management service, such as Hashicorp Vault, may be considered as a prerequisite for performing deployments through the automation framework 300. The key management service can be configured and available before an automatic creation of a blockchain is triggered.

IAM is the process of defining and managing access privileges of network users and determining how users are granted or denied those privileges. The automation framework may delegate the identity authentication management to be handled by application use-case basis.

A Certificate Authority (CA) dispenses certificates to different users. These certificates are digitally signed by the CA and bind together the actor with the actor's public key (and optionally with a comprehensive list of properties). As a result, if one trusts the CA (and knows its public key), it can trust that the specific actor is bound to the public key included in the certificate, and owns the included attributes, by validating the CA's signature on the actor's certificate. The automation framework 300 may provide key management services to generate certificates and keys (for all platforms) and also may provide CA servers.

The automation framework 300 may provide development services 320 to support development of on-ledger (e.g., smart contracts) or off-ledger services based on a software development kit (SDK) and integrated development environment (IDE) (e.g. Web APIs). The provided development services 320 may include maintenance, monitoring, and administration of a blockchain network and its on- and off-ledger services. The development services 320 may include services associated with version management, configuration management, deploy services, build and test management, delivery management, other.

Version management capabilities enable change control of smart contract and decentralized applications. Version management can support operations that track different code versions corresponding to different releases. For example, GIT can be used as a version management tool.

Configuration management involves automation of scripts and ad-hoc practices in a consistent, reliable, and secure way. Configuration Management enables operators to set-up blockchain networks independently by using minimum configuration changes.

The automation framework 300 may utilize a configuration management tool such as Ansible. The configuration management tool may provide a goal-oriented resource model that defines a desired state of a computer system and services. Based on such a configuration management tool, one system can be transformed to a desired state (and also supports a "dry run" mode to preview needed changes). In such manner, reliability and decrease in potential failures from scripting and script-based solutions that describe explicit and often irreversible actions rather than the end goal can be avoided.

The automation framework 300 may include deploy services, such as Kubernetes Deploy/Operate service that provides services that are used to deploy desired state of various services on Kubernetes clusters. Such services may also be used for maintenance and operations of these services. The automation framework 300 may also use Helm to deploy a service or system in a desired state by using a packaging format called charts. A chart is a collection of files that describe a related set of Kubernetes resources. In some examples, a chart may be used to deploy a memcached pod (in Kubernetes) through Memcached, which can be described as a general-purpose distributed memory-caching system. In some examples, a chart may be used to deploy a full web application stack with HTTP servers, databases, caches, such as a desired blockchain platform. With the use of Helm, a set of services and deployments can be deployed together as a release.

The development service 320 may include Infrastructure as Code (IaC) services. IaC is a process of managing and provisioning cloud hardware through machine-readable definition files, rather than physical hardware configuration or interactive configuration tools. IaC can be versioned and used to deploy cloud environments independently.

The development services 320 may include Build, Test, and Artifact Management services. Build, test, and artifact management capabilities enable continuous delivery management by ensuring automation of the build and deployment of artefacts.

The automation framework 300 may use TravisCI for running static tests, builds, and for storing of Docker images. Jenkins Pipelines (as code) are also available for continuous deployment/reset of blockchain networks.

The development services 320 may include delivery management services. Delivery management is the process where software, artifacts, and data from disparate tools used to adopt a product or feature are integrated into a unified common data layer.

The automation framework 300 may integrate with GitHub for reporting and tracking new features, bugs/issues and releases. The automation framework 300 may also be integrated with tools like Jira and Confluence.

The automation framework 300 also provides presentation services 330. The presentation services 330 specify how an application will be provided to an end-user. The presentation services 330 defines on-ledger and/or off-ledger services and capabilities through different channels.

The automation framework 300 includes integration services 340. The integration services 340 can be a combination of the services to interact with on- and off-ledger services through APIs or ledger protocols including runtime and operations services.

The automation framework 300 includes distributed data platforms 350. The distributed data platforms form a core of a distributed architecture solution. The automation framework 300 support both distributed ledgers and distributed databases. The automation framework supports automatic deployment of blockchain network over different platform types such as Corda, Hyperledger Fabric, Hyperledger Indy, Hyperledger Besu, and Quorum.

The automation framework 300 includes infrastructure services 370. The infrastructure services refer to the various services needed to run or deploy different services of a distributed ledger architecture. The infrastructure services 370 include cloud providers and container services. A Cloud Provider is a company that delivers cloud computing-based services with features like scalability and easy maintenance.

In some instances, the automation framework 300 may be built on Kubernetes, so the automation framework 300 can run on any cloud-computing provider providing Kubernetes as a service including private and hybrid clouds. Container services allow users to deploy and manage containers using container-based virtualization. Containers allow a developer to package up an application with all of the parts it needs, such as libraries and other dependencies, and provide it as one package. The automation framework 300 may use containerization technologies, such as Docker and Kubernetes. Kubernetes (K8s) is an open-source system for automating deployment, scaling, and management of containerized applications. Docker is a tool designed to make it easier to create, deploy, and run applications by using containers.

The automation framework 300 includes a Backup/Restore service 395. Disaster recovery involves a set of policies, tools and procedures to enable the recovery of vital technology infrastructure and systems following a natural or human-induced disaster. Even though blockchain applications are self-replicating, complete auto-recovery may not be always possible. Therefore, it is important to have guidelines around backing up the data in a distributed store and restoring it using a conventional restoring mechanism. Backup is the process of copying and archiving data. Restore is the process of returning data that has been lost, stolen or damaged, from a secondary storage.

Figure 4:
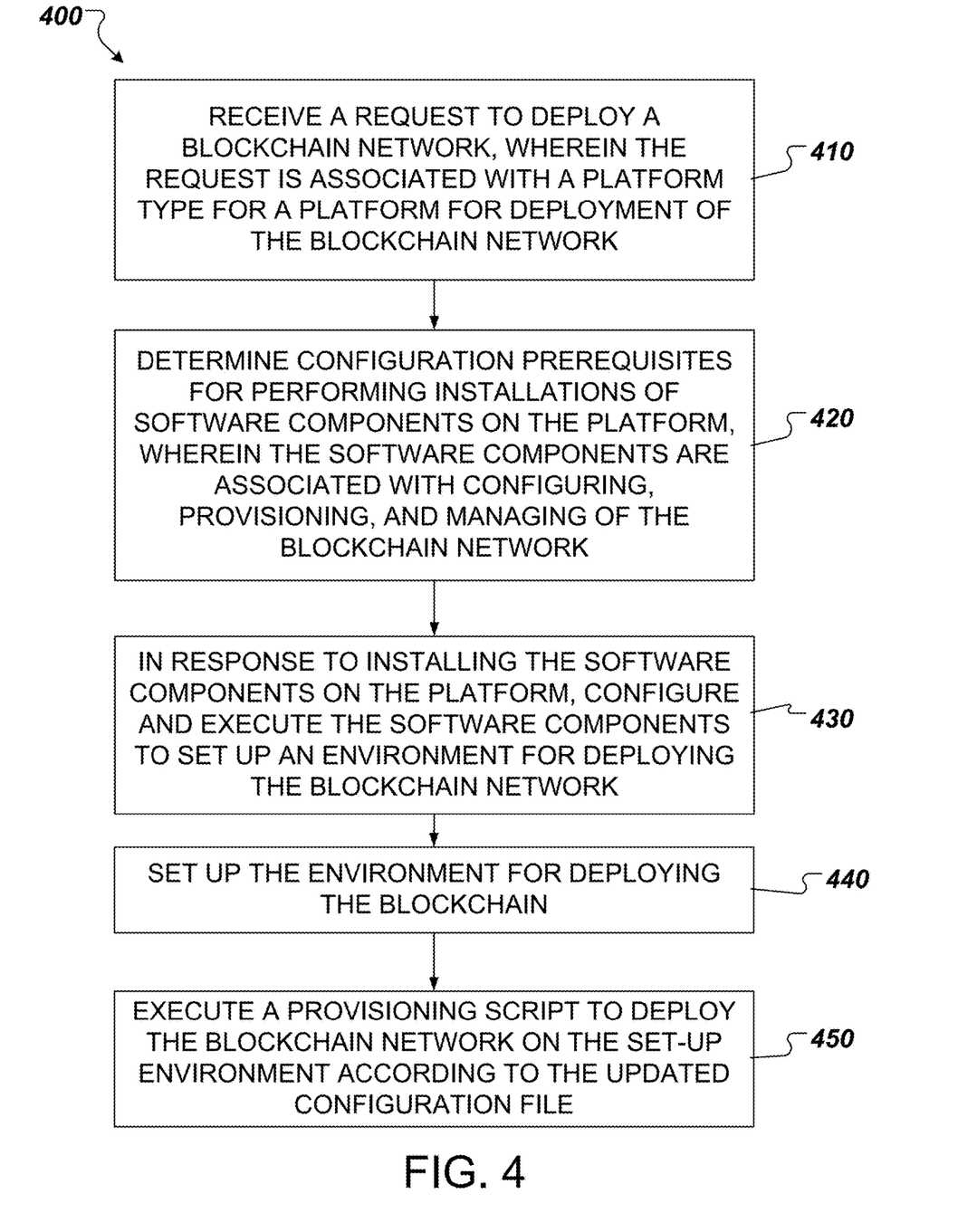
FIG. 4 depicts an example process that can be executed in accordance with implementations of the present disclosure.

FIG. 4 depicts an example process 400 that can be executed in accordance with implementations of the present disclosure. It will be understood that the process 400 and related processes may be performed, for example, by any suitable system, environment, software, and hardware, or a combination of systems, environments, software, and hardware, as appropriate. In some implementations, the example process 400 and related processes are executed by one or more components of the system 100 described above with respect to FIG. 1.

In some instances, the example process 400 may be executed using an automation framework such as the automation blockchain framework 210 of FIG. 2, or the example system 300 of FIG. 3. In some instances, the automation framework may provide services for automatic configuration and deployment of blockchain networks associated with different platform types. The automation framework may be instantiated to provide tools to support automatic deployment of blockchain networks of different network types.

At 410, a request is received at an automation framework, such as the automation blockchain framework 210 of FIG. 2. The received request is for deploying a blockchain network. The request is associated with a platform type of a platform for deployment of the blockchain network. The platform type of the platform is associated with a corresponding configuration file from a plurality of configuration files maintained at the automation framework as related to different platform types. For example, the configuration file may be defined according to a file schema, such as the example configuration file 600 of FIG. 6, discussed in further detail herein.

In some instances, the platform that is identified by the configuration file may be instantiated to employ a production reference architecture that integrates blockchain technology services with services for automatically building a production deployment of a cloud infrastructure based on the configuration file. In some instances, the configuration file defines one or more services provided from the software components installed on the one or more platforms to be executed in relation to creating the blockchain network.

At 420, configuration prerequisites for performing installations of software components on the platform are determined. In some instances, the determined the software components are associated with configuring, provisioning, and managing of the blockchain network. The determined software components may be installed on the platform selected for deploying the blockchain network.

In some instances, to ensure that a production-ready blockchain network can be created, a set of pre-requisites can be identified in relation to executed services at the automation framework. To create the blockchain network, a configuration file has to be received and a set of nodes for running application source code may be executed. For example, one running Kubernetes cluster can be executed for creating a blockchain network associated with one entity associated with the request. For example, an organization may request the creation of the blockchain network for supporting secure transactions with other entities.

At 430, the software components are configured and executed to set up an environment for deploying the blockchain network.

At 440, the environment for deploying the blockchain network is set up. To set up the environment, multiple operations can be executed. A build folder may be created at the automation framework. The configuration file, received with the request at 410, may be copied into the build folder. Key files associated with private keys or certificates for accessing a source code repository may be copied into the build folder. The configuration file can be updated according to criteria associated with the platform type of the determined platform for the deployment.

In some instances, during the set-up of the environment for deploying the blockchain network, it may be verified whether the blockchain is successfully configured. The verification may be performed by verifying statuses associated with different namespaces associated with clusters where the blockchain is running.

In some instances, when the build folder is created, a source code repository can be cloned in the build folder inside the automation framework. For example, the source code repository may be a GIT repository that is cloned on an Ansible controller. In the build folder the configuration files and the private key files can be copied. Depending on the type of a platform that is defined by the configuration file, a corresponding network configuration file for the blockchain network can be selected and updated.

In some instances, once prerequisites are configured, the automation framework may update the configuration file depending on a platform being requested. Depending on the request for a platform and platform type, there can be differences in the configuration file. For example, there can be different configuration files that can be used when a request for creating a blockchain network is associated with R3 Corda, Hyperledger Fabric, Hyperledger Indy, Quorum Configuration File, etc.

After the configuration file is updated, the updated configuration file can be saved, for example, on the Ansible Controller, and the provisioning script can be executed to deploy the network using a command. In some instances, configuration performed by the automation framework can be an Ansible script, which can be executed once Ansible is installed on a machine from which the blockchain network would be deployed. In some instances, this can be a local machine, and the machine can be configured to run Ansible commands.

At 450, a provisioning script is executed to deploy the blockchain network on the set-up environment according to the updated configuration file. The blockchain network may be deployed in a production-ready mode to provide secure interaction between defined entities at the configuration file.

In some instances, the deployed blockchain network can be deleted, for example, based on instructions received at the automation framework. The blockchain network may be deleted by executing a script that resets the blockchain network using the configuration file that was used to set up the environment of the blockchain network.

A deployment script that can be used by the automation framework to deploy a blockchain network can be reused across cloud providers such as Amazon Web Services (AWS), Azure, Google Cloud Platform, OpenShift, among others.

Figure 5:
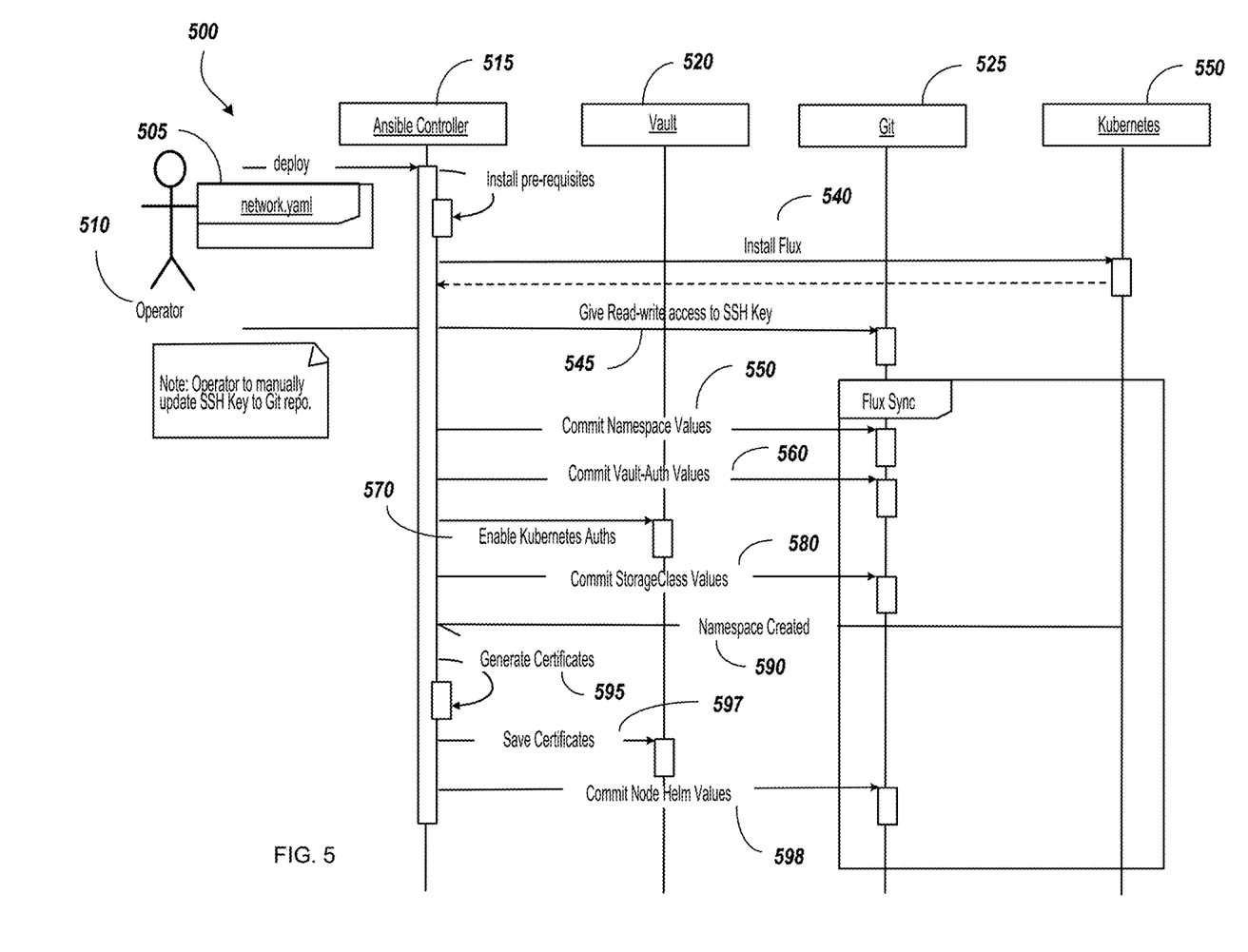
FIG. 5 depicts an example process for automatic deployment of a distributed ledger network that can be executed in accordance with implementations of the present disclosure.

FIG. 5 depicts an example process 500 for automatic deployment of a blockchain network that can be executed in accordance with implementations of the present disclosure. In some instances, the process 500 may be executed in relation to an automation framework such as the automation frameworks discussed in relation to FIG. 2, FIG. 3, and FIG. 4. The automation framework that executes the example process 500 may include a configuration tool, such as the Ansible controller 515, a key management tool such as Vault 520, a repository such as GIT 525 and a deployment framework such as Kubernetes 530. It can be reasonable appreciated that other examples of tools can be used in a similar manner to perform the operations of example process 500.

The Ansible controller 515 can be configured, for example, with a sample inventory file, such as the network.yaml 505 file. The content of the file can be added in an Ansible host configuration file, for example, at file/etc/ansible/hosts.

A set of pre-requisites is installed on the Ansible controller 515. In some instances, the pre-requisites may be such as the determined configuration prerequisite described in relation to operation 420 of FIG. 4. At 540, the automation framework may install and configure Flux for each cluster. The authentication can be provided with a secure shell hash (SSH) key, and the key can be generated before executing a deployment operation and provided to the Ansible Controller 515.

In some instances, GIT 525 is installed and is provided with read and write access rights with the SSH Key as received at 540. At 550, GIT 525 is configured by specifying a username and email address.

A key management tool, such as Hashicorp Vault, can be defined as one of the pre-requisites for automation framework. The Vault 520 service should be accessible by the Ansible host as well as the Kubernetes 530 cluster by configuring proper inbound/outbound rules. Thus, at 570, vault authentication values are committed at GIT 525, and Vault 520 is enabled for Kubernetes authentication at 570. At 580, storage class values are committed to GIT 525 and at 590, a namespace is created at Kubernetes 530.

At 595, certificates are generated at the Ansible Controller 515, and the certificates are saved at the Vault 520 component, at 597. The Ansible controller 515 commits, at 598, the node values to the GIT 525 component.

Figure 6:
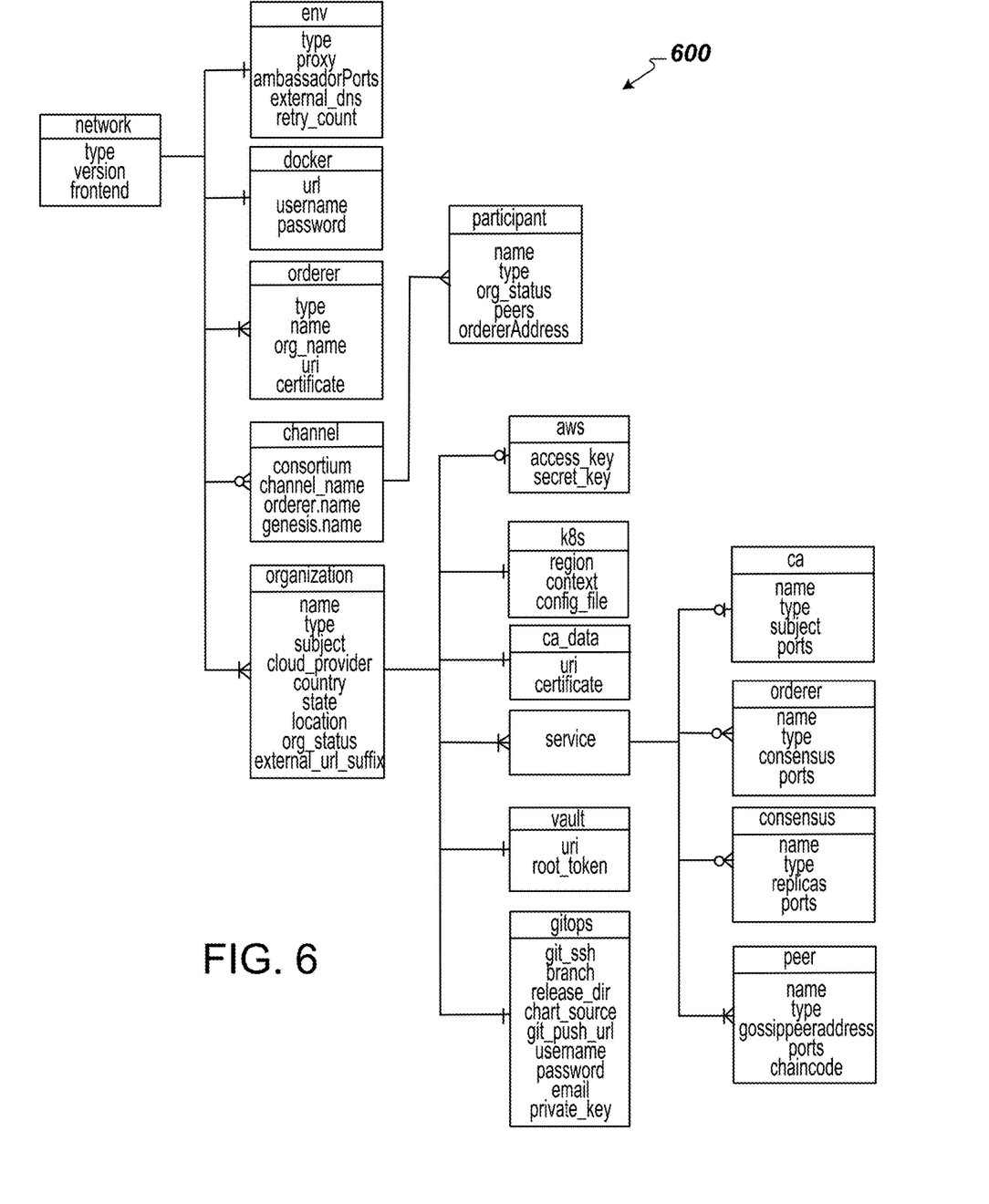
FIG. 6 depicts an example configuration file schema for initiating deployment of a distributed ledger network in accordance with implementations of the present disclosure.

FIG. 6 depicts an example configuration file schema 600 for initiating deployment of a blockchain network in accordance with implementations of the present disclosure.

The example configuration file schema 600 is a file schema for a configuration file that can be used for deploying a blockchain network based on, by way of non-limiting example, the Hyperledger Fabric platform. The configuration file may be named as a network.yaml file and can be defined as the base configuration file designed in the automation framework for setting up a Fabric blockchain network. Such a file may include the information related to the infrastructure and network specifications.

Before setting up a Fabric blockchain network, the configuration file is to be updated with the required specifications, as described in relation to operation 430 and 440 of FIG. 4. The configurations can be grouped in sections such as type, version, docker, frontend, env, orderers, channels, organizations. The type may define a platform type, such as Corda or Fabric, where the instant example is Fabric. The version may define a version of platform being used. Frontend may be a flag defining whether a frontend is enabled for nodes. The flag value may be enabled or disabled. The env section contains the environment type and an additional port configuration. The docker section may include the credentials of the repository where the required images are built and stored. The orderers section may include a list of orderers with variables that can be used to expose it for the network. The channels sections may comprise a list of channels mentioning the participating peers of the organizations. The organizations section may include the specifications of each organization.

Figure 7:
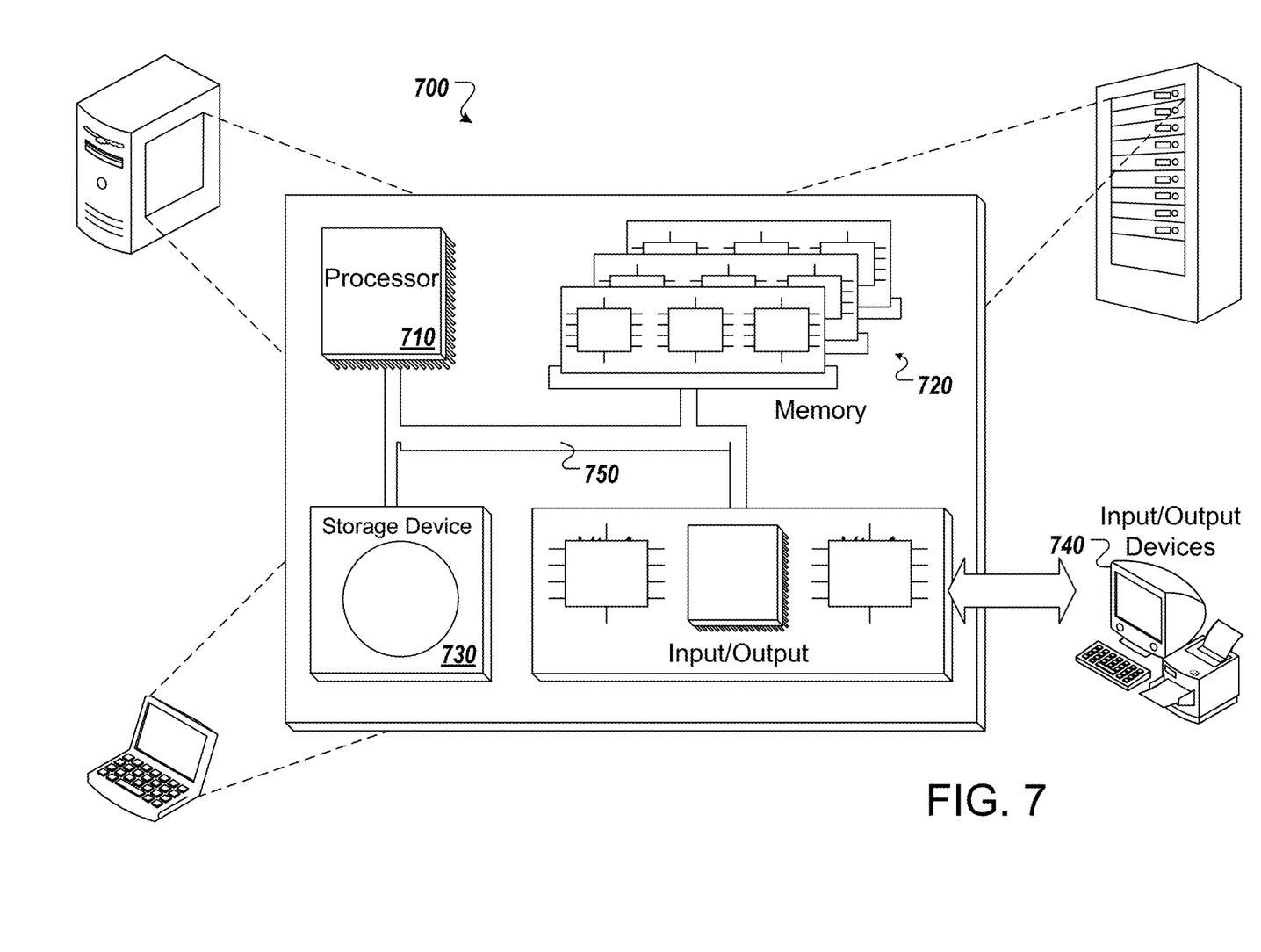
FIG. 7 is a schematic illustration of example computer systems that can be used to execute implementations of the present disclosure.

FIG. 7 is a schematic illustration of example computer systems that can be used to execute implementations of the present disclosure. FIG. 7 provides a schematic diagram of an example computing system 700. The system 700 can be used for the operations described in association with the implementations described herein. For example, the system 700 may be included in any or all of the server components discussed herein. The system 700 includes a processor 710, a memory 720, a storage device 730, and an input/output device 740. The components 710, 720, 730, 740 are interconnected using a system bus 750. The processor 710 is capable of processing instructions for execution within the system 700. In some implementations, the processor 710 is a single-threaded processor. In some implementations, the processor 710 is a multi-threaded processor. The processor 710 is capable of processing instructions stored in the memory 720 or on the storage device 730 to display graphical information for a user interface on the input/output device 740.

The memory 720 stores information within the system 700. In some implementations, the memory 720 is a computer-readable medium. In some implementations, the memory 720 is a volatile memory unit. In some implementations, the memory 720 is a non-volatile memory unit. The storage device 730 is capable of providing mass storage for the system 700. In some implementations, the storage device 730 is a computer-readable medium. In some implementations, the storage device 730 may be a floppy disk device, a hard disk device, an optical disk device, or a tape device. The input/output device 740 provides input/output operations for the system 600. In some implementations, the input/output device 740 includes a keyboard and/or pointing device. In some implementations, the input/output device 740 includes a display unit for displaying graphical user interfaces.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the to be filed claims.

What is claimed is:

1. A computer implemented method for automatic creation of distributed ledger networks, the method being executed by one or more processors and comprising:
    receiving, by an automation framework, a request to deploy a distributed ledger network, the request being associated with a platform type of one or more platforms for deployment of the distributed ledger network, wherein the platform type is associated with a respective configuration file from a plurality of configuration files maintained at the automation framework as related to different platform types;
    determining, by the automation framework, configuration prerequisites for performing installations of software components on the one or more platforms;
    installing the software components to perform configuring, provisioning, and managing of the distributed ledger network on the one or more platforms, wherein the software components include a configuration management tool to deploy the distributed ledger network;
    in response to installing the software components on the one or more platforms, configuring and executing, by the automation framework, the software components to set up an environment for deploying the distributed ledger network by:
        creating a build folder in the automation framework,
        copying, into the build folder, a configuration file associated with the platform type and key files for accessing a source code repository, wherein the configuration file stores a schema for initiating a deployment of the distributed ledger network, and wherein the configuration file is a base configuration file including information related to infrastructure and network specifications,
        before setting up the environment for deploying the distributed ledger network, updating the configuration file depending on the platform type to generate an updated configuration file, wherein the updated configuration file includes access data, security metadata, network metadata, and account data for accessing the source code repository,
        saving the updated configuration file, and
        executing, by the configuration management tool, a provisioning script to deploy the distributed ledger network on the set-up environment according to the updated configuration file.

2. The method of claim 1, wherein the automation framework provides services for automatic configuration and deployment of one or more distributed ledger networks associated with different platform types.

3. The method of claim 1, wherein the automation framework is instantiated to provide tools to support deployment of distributed ledger networks of multiple network types.

4. The method of claim 1, wherein the configuration file defines one or more services provided from the software components installed on the one or more platforms to be executed in relation to creating the distributed ledger network.

5. The method of claim 1, wherein the one or more platforms are instantiated to employ a production reference architecture that integrates distributed ledger technology services with services for automatically building a production deployment of a cloud infrastructure based on the configuration file.

6. The method of claim 5, wherein the one or more platforms provide resources for deploying a platform application on the cloud infrastructure based on executing configuration and deployment services provided by the platform.

7. The method of claim 1, wherein the distributed ledger network is deployed in a production-ready mode to provide secure interaction between defined entities at the configuration file.

8. The method of claim 1, further comprising:
deleting the deployed distributed ledger network by executing a script that resets the distributed ledger network using the configuration file.

9. The method of claim 1, wherein setting up the environment for deploying the distributed ledger network comprises:
verifying whether a distributed ledger of the distributed ledger network is successfully configured by verifying statuses associated with different namespaces associated with clusters where the distributed ledger is running.

10. A non-transitory computer-readable storage medium coupled to one or more processors and having instructions stored thereon which, when executed by the one or more processors, cause the one or more processors to perform operations, the operations comprising:
receiving, by an automation framework, a request to deploy a distributed ledger network, the request being associated with a platform type of one or more platforms for deployment of the distributed ledger network, wherein the platform type is associated with a respective configuration file from a plurality of configuration files maintained at the automation framework as related to different platform types;
determining, by the automation framework, configuration prerequisites for performing installations of software components on the one or more platforms;
installing the software components to perform configuring, provisioning, and managing of the distributed ledger network on the one or more platforms, wherein the software components include a configuration management tool to deploy the distributed ledger network;
in response to installing the software components on the one or more platforms, configuring and executing, by the automation framework, the software components to set up an environment for deploying the distributed ledger network by:
creating a build folder in the automation framework,
copying, into the build folder, a configuration file associated with the platform type and key files for accessing a source code repository, wherein the configuration file stores a schema for initiating a deployment of the distributed ledger network, and wherein the configuration file is a base configuration file including information related to infrastructure and network specifications,
before setting up the environment for deploying the distributed ledger network, updating the configuration file depending on the platform type to generate an updated configuration file, wherein the updated configuration file includes access data, security metadata, network metadata, and account data for accessing the source code repository,
saving the updated configuration file, and
executing, by the configuration management tool, a provisioning script to deploy the distributed ledger network on the set-up environment according to the updated configuration file.

11. The computer-readable medium of claim 10, wherein the configuration file defines one or more services provided from the software components installed on the one or more platforms to be executed in relation to creating the distributed ledger network.

12. The computer-readable medium of claim 10, wherein the automation framework provides services for automatic configuration and deployment of one or more distributed ledger networks associated with different platform types, and wherein the automation framework is instantiated to provide tools to support deployment of distributed ledger networks of multiple network types.

13. The computer-readable medium of claim 10, wherein the one or more platforms are instantiated to employ a production reference architecture that integrates distributed ledger technology services with services for automatically building a production deployment of a cloud infrastructure based on the configuration file, and wherein the one or more platforms provide resources for deploying a platform application on the cloud infrastructure based on executing configuration and deployment services provided by the platform.

14. The computer-readable medium of claim 10, further comprising instructions, which when executed by the one or more processors, cause the one or more processors to perform operations, the operations comprising:
deleting the deployed distributed ledger network by executing a script that resets the distributed ledger network using the configuration file.

15. The computer-readable medium of claim 10, wherein setting up the environment for deploying the distributed ledger network comprises:
verifying whether a distributed ledger of the distributed ledger network is successfully configured by verifying statuses associated with different namespaces associated with clusters where the distributed ledger is running.

16. A system, comprising:
a computing device; and
a computer-readable storage device coupled to the computing device and having instructions stored thereon which, when executed by the computing device, cause the computing device to perform operations, the operations comprising:
receiving, by an automation framework, a request to deploy a distributed ledger network, the request being associated with a platform type of one or more platforms for deployment of the distributed ledger network, wherein the platform type is associated with a respective configuration file from a plurality of configuration files maintained at the automation framework as related to different platform types;
determining, by the automation framework, configuration prerequisites for performing installations of software components on the one or more platforms;

installing the software components to perform configuring, provisioning, and managing of the distributed ledger network on the one or more platforms, wherein the software components include a configuration management tool to deploy the distributed ledger network;

in response to installing the software components on the one or more platforms, configuring and executing, by the automation framework, the software components to set up an environment for deploying the distributed ledger network by:

creating a build folder in the automation framework, copying, into the build folder, a configuration file associated with the platform type and key files for accessing a source code repository, wherein the configuration file stores a schema for initiating a deployment of the distributed ledger network, and wherein the configuration file is a base configuration file including information related to infrastructure and network specifications, before setting up the environment for deploying the distributed ledger network, updating the configuration file depending on the platform type to generate an updated configuration file, wherein the updated configuration file includes access data, security metadata, network metadata, and account data for accessing the source code repository, saving the updated configuration file, and executing, by the configuration management tool, a provisioning script to deploy the distributed ledger network on the set-up environment according to the updated configuration file.

17. The system of claim 16, wherein the configuration file defines one or more services provided from the software components installed on the one or more platforms to be executed in relation to creating the distributed ledger network.

18. The system of claim 16, wherein the automation framework provides services for automatic configuration and deployment of one or more distributed ledger networks associated with different platform types, wherein the automation framework is instantiated to provide tools to support deployment of distributed ledger networks of multiple network types, wherein the one or more platforms are instantiated to employ a production reference architecture that integrates distributed ledger technology services with services for automatically building a production deployment of a cloud infrastructure based on the configuration file, and wherein the one or more platforms provide resources for deploying a platform application on the cloud infrastructure based on executing configuration and deployment services provided by the platform.

19. The system of claim 16, wherein the computer-readable storage device further comprises instructions stored thereon, which when executed by the computing device, cause the computing device to perform operations, the operations comprising:

deleting the deployed distributed ledger network by executing a script that resets the distributed ledger network using the configuration file.

* * * * *